3,113,932
DRYING COMPOSITIONS COMPRISING POLY-
EPOXIDE POLYESTERS OF TETRAHYDRO-
PHTHALIC ACID AND ALIPHATIC GLYCOLS
MODIFIED WITH UNSATURATED MONO-
CARBOXYLIC ACID
Sylvan Owen Greenlee, West Lafayette, Ind., and John W.
Pearce, Racine, Wis., assignors to S. C. Johnson &
Sons, Inc., Racine, Wis.
No Drawing. Filed Feb. 9, 1959, Ser. No. 791,843
18 Claims. (Cl. 260—22)

This invention relates to new synthetic drying compositions which are valuable in the manufacture of varnishes, coating compositions, and other complex reaction products, and more particularly concerns compositions prepared from unsaturated aliphatic acids and polyepoxide polyesters of tetrahydrophthalic acid and glycols. The invention includes the initial reaction mixtures, as well as the intermediate and final reaction products derived therefrom.

It is an object of this invention to produce drying compositions from unsaturated aliphatic acids and polyepoxides which may be readily converted to a cross-linked polymeric product having good chemical resistance, and having improved hardness, flexibility and other desirable properties.

Another object of this invention is to produce drying compositions of the hereinbefore described characteristics from polyepoxide polyesters which may be selected with a relatively high degree of epoxidation, and which may be easily esterified with unsaturated aliphatic acids to give valuable reaction products.

These and other objects and advantages are attained by the present invention, various novel features of which will become more fully apparent from the following description, with particular reference to specific examples which are to be considered as illustrative only.

According to the present invention, mixtures of monobasic unsaturated aliphatic acids and polyepoxide polyesters of tetrahydrophathalic acid and glycols are prepared which may be converted by such means as heat and air drying to yield complex reaction products. These complex reaction products are obtained by the reaction of the epoxide groups of the polyepoxide with the carboxyl groups of the unsaturated acids, and by polymerization through the unsaturated portions of the unsaturated aliphatic acids. The polyepoxide polyesters employed in this invention are themselves ester polymers, and may be prepared with various degrees of polymerization. Since the molecular weight of these polyepoxides may be readily adjusted, and since these polyepoxides may be prepared with a large number of epoxide groups per molecule, an opportunity is provided by selecting a highly epoxidized polyepoxide to produce valuable drying compositions by esterifying a relatively large amount of unsaturated acid with each molecule of polyepoxide. And, since the esterification of an acid proceeds at an appreciably faster rate with an epoxide group as compared to a hydroxyl group, the compositions of this invention using polyepoxides having a large number of epoxide groups are particularly well suited for the preparation of drying compositions where it is desired to reduce the time required in the esterification of the unsaturated acid materials.

The unsaturated aliphatic acids which may be used in esterifying the polyepoxide polyester resins are monobasic acids containing from 6 to about 25 or more carbon atoms and may be illustrated by such acids as sorbic acid, undecenoic acid and the animal and vegetable drying oil acids such as linseed oil acid, oleic acid, and China-wood oil acid. These acids may contain various degrees of unsaturation and will polymerize through their unsaturated portions to form more highly polymerized structures.

The polyepoxide polyesters used in this invention may be conveniently prepared by the epoxidation of the polyesters formed in the esterification of tetrahydrophthalic acid and glycols, the anhydride form of the acid usually being used. The polyesters may also be prepared by the reaction between glycols and simple esters of tetrahydrophthalic acid such as dimethyl or diethyl esters. This latter reaction would involve alcoholysis, or the displacing of the ethyl or methyl alcohol by the appropriate glycol.

Glycols which may be used in the preparation of the polyesters include such glycols as ethylene glycol, diethylene glycol, tetramethylene glycol, propylene glycol, pentamethylene glycol, polyethylene glycols, and neopentyl glycol, as well as the longer-chain glycols, such as the 36-carbon glycol prepared by the sodium or catalytic reduction of the simple esters of dimerized 18-carbon soyabean oil acids. Due to the ease of dehydration under the conditions necessary for esterification, the polyesters are generally prepared from primary and secondary glycols, since with the tertiary glycols there is a tendency to remove the hydroxyl group and form an unsaturated bond.

Mixed polyesters may be employed in the invention. The term mixed polyesters is intended to embrace the reaction products of tetrahydrophthalic acid and a mixture of aliphatic glycols, a mixture of tetrahydrophthalic acid and another dibasic acid or acids with a single aliphatic glycol, or a mixture of tetrahydrophthalic acid and another dibasic acid or acids with a mixture of aliphatic glycols. Also embraced by the term are physical mixtures of these mixed reaction products and physical mixtures of the simple polyesters which comprise the reaction product of tetrahydrophthalic acid and a single aliphatic glycol.

Without intending to limit the invention in any way the following list of dicarboxylic acids which may be employed together with tetrahydrophthalic acid in the formation of the polyesters is given: oxalic, malonic, succinic, glutaric, adipic, pimelic, suberic, azelaic, sebacic, maleic, fumaric, malic, tartaric, diphenic, phthalic, isophthalic, terephthalic, 1,8-naphthalic, etc.

The polyesters may be further modified by the inclusion of small amounts of additional materials. For example, the solubility of the polyesters and resultant synthetic waxes can be increased by the addition of limited amounts of polyhydric alcohols and polybasic acids having more than two alcoholic hydroxyl groups and carboxyl groups respectively.

It is preferred that not more than about 50% of the average number of the acid units comprising the polyesters will consist of dibasic acids other than tetrahydrophthalic acid. A greater number of epoxidized tetrahydrophthalic residues in the polyester molecules permits esterification with a greater number of unsaturated monocarboxylic acid molecules, thus permitting the preparation of more extensively modified products. However, in the present invention the only critical limitation is that the polyepoxide polyesters contain a plurality of 1,2 epoxide groups on the tetrahydrophthalic acid residues.

By properly proportioning the concentrations of tetrahydrophthalic anhydride, other dibasic acids if used, and glycols in the esterification reaction, the degree of polymerization occurring during the polyester formation may be controlled. Any excess acidity or hydroxyl content present in the polyester reaction mixture may be neutralized by reaction with a monohydric alcohol or a monobasic acid, and by properly selecting these monofunctional reactants, slightly different properties may be given to the polyester compositions formed in the esterification reaction.

The polyepoxide polyester may be prepared from these polyesters by epoxidizing the unsaturated portions of the tetrahydrophthalic acid residues in the polyester composition. The epoxidation of the polyesters, as well as the preparation of the polyester compositions, are more fully described in a copending application having Serial No. 503,323, filed April 22, 1955, now abandoned.

The number of epoxide groups per molecule and the molecular weight of the composition may be controlled by adjusting the degree of polymerization which takes place in the esterification reaction, controlling the extent of the epoxidation of the polyester, and by proper selection of the glycols and dibasic acids used in the esterification reaction with tetrahydrophthalic acid. For instance, the epoxidized polymer formed by epoxidizing the polyester of a long-chain glycol and tetrahydrophthalic acid would have a lower degree of epoxidation per a given weight than the epoxidized polymer formed in the epoxidation of a polyester prepared with a shorter-chain glycol, and the molecular weight of each of these compositions may be controlled by regulating the degree of polymerization in the polyester formation. Polyepoxide polyester compositions having up to 12 or more epoxide groups per molecule have been found to be useful in formulating the compositions herein described. The polyepoxide polyester compositions used herein may have varying structures so long as they do not contain functional groups which interfere with the desired reaction of the polyepoxide polyester and unsaturated aliphatic acids.

The proportions of unsaturated aliphatic acids and polyepoxide polyesters used in this invention may be varied, and mixtures of different polyepoxides containing tetrahydrophthalic acid and different unsaturated aliphatic acids may be used. In the reaction of an epoxide group with a carboxyl group, initially the esterification involves direct splitting of the epoxide group by addition so that one unreacted hydroxyl group is present for each ester group formed. This reaction may be illustrated as follows:

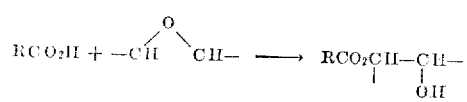

wherein R represents an ethylenically unsaturated aliphatic moiety, having from about 6 to about 25 carbon atoms in a carbon to carbon chain. In the esterification of these acids, the process may be carried out so that the esterification includes esterification of the hydroxyl groups formed by this splitting of the epoxide groups, in addition to the esterification by the epoxide groups, as illustrated above. Since esterification of carboxyl groups by hydroxyl groups requires a prolonged heating period at elevated temperatures, in this instance, esterification is usually done by heating the reaction mixture for several hours under conditions such that olefin polymerization does not occur to any substantial extent. A temperature range embracing the esterification of all reactants embraced by the invention, cannot be specifically stated, since, as is characteristic of many chemical reactions, the reactivity of the mixture depends on the physical and chemical characteristics of the reactants and additionally is a function of time, temperature, the degree of agitation, etc., employed. The sole criterion is that the mixture be brought to a temperature sufficient to esterify the epoxide groups of the polyester with the carboxyl groups of the long chain saturated aliphatic acids. In most instances, the esterification may be conveniently carried out at temperatures of from 190 to 275° C. while removing water formed in the esterification by bubbling an inert gas such as nitrogen through the mixture. Cross linking of the mixture is then effected after esterification, usually with the aid of a metallic ion type drier which catalyzes the polymerization of the olefin groups, so that complex reaction products are formed.

As stated earlier the unsaturated aliphatic monobasic acids contain from about 6 to about 25 or more carbon atoms. The following unsaturated monobasic acids are representative of this group of acids: sorbic, oleic, palmitoleic, euric, decenoic, dodecenoic, tetradecenoic, linoleic, linolenic, ricinoleic and, of course, the animal and vegetable drying oil acids such as linseed oil acid, castor oil acids, rape seed oil acids, sperm oil acids, and Chinawood oil acids which for the most part are mixtures of the longer chain unsaturated monocarboxylic acids, several of which are mentioned above.

If desired, the esterification may be carried out so that the reaction occurring during the esterification is essentially only the reaction of epoxide groups with carboxyl groups present. Since esterification of carboxyl groups by epoxide groups is considerably faster than esterification by hydroxyl groups, esterification may be carried out in this manner by using reaction mixtures having substantially one or more epoxide groups present for each carboxyl group present. Using these proportions polymerization through the unsaturated portions and esterification may be conveniently carried out simultaneously so that complex products may be formed directly without prior esterification of the carboxyl groups present in the mixture. This process has many advantages including the elimination of the rather costly pre-esterification normally required, as well as offering the opportunity to prepare compositions previously impracticable to obtain. For instance, pre-esterification of highly unsaturated acids such as China-wood oil acid has been found not to be feasible since the high degree of unsaturation renders the acid sensitive to heat polymerization through the unsaturated portions during the esterification reaction. Such a process is more fully described in a copending Greenlee et al. application entitled "Epoxide Conversion of Unsaturated Acids," Serial No. 519,273, filed June 30, 1955, now U.S. Patent No. 3,023,178. The compositions of this invention wherein polyepoxides are used having a high degree of epoxidation are particularly well suited for the preparation of complex products by employing this procedure.

The new synthetic drying compositions of this invention produce films which, when they had been cured under moderate heat-curing conditions, have excellent water resistance. The cured compositions are tough and flexible, making them particularly valuable in the preparation of protective coatings and adhesives.

The following examples will serve to illustrate this invention, however, it should be understood that the invention is not intended to be limited thereby. In the examples, proportions expressed are parts by weight unless otherwise indicated.

Examples I, II, and III illustrate the preparation of typical polyepoxide polyesters from tetrahydrophthalic anhydride and glycol.

EXAMPLE I

In a 3-neck flask provided with a thermometer, a mechanical agitator, and reflux condenser attached through a water trap was placed a mixture of 1.1 mols tetrahydrophthalic anhydride and 0.2 mol n-butanol. After the melting of the tetrahydrophthalic anhydride in the presence of the butanol, 1 mol of 1,4-butanediol was added. The reaction mixture was gradually heated with agitation to 225° C. at which point a sufficient amount of xylene was added to give refluxing at esterification temperature. The reaction mixture was then heated with continuous agitation at 225–235° C. until the acid value decreased to 8.6, a period of about 24 hours. Acid value as herein described represents the number of milligrams of KOH equivalent to the acidity present in a one-gram sample. The polyester product was a highly viscous, tacky solid having slight flow at room temperature.

A dehydrated cation exchange resin of the sulfonated styrene-divinylbenzene copolymer type was prepared. Cation exchange resins of this type such as Dowex 50 (Dow Chemical Company) and Amberlite IR-120 (Rohm & Haas Company) are purchased commercially as the alkali salt form. The dehydrated cation exchange resin was prepared by washing the alkali salt form several times with 4 to 6 normal hydrochloric acid. The neutralized resin was then washed with distilled water to remove excess mineral acid and inorganic salt. The neutralized resin was dehydrated by warming the washed resin in a vacuum oven at temperatures of around 80° C. for a period of approximately 16 hours.

In a 3-neck flask provided with a thermometer, a mechanical agitator, and a reflux condenser was placed 107 parts of the dehydrated acid form of cation exchange resin and 30 parts glacial acetic acid. The mixture of cation exchange resin and acetic acid was allowed to stand until the resin had completely taken up the acid. To this mixture was added 273 parts nonvolatile of the polyester resin dissolved in an equal weight of xylene. To the continuously agitated reaction mixture was added dropwise over a period of 45 minutes to 1 hour 75 parts of 50% hydrogen peroxide. The reaction temperature was held at 60° C. requiring the application of some external heat until a milliliter sample of the reaction mixture analyzed less than 1 milliliter of 0.1 N sodium thiosulfate in an iodometric determination of hydrogen peroxide. In some preparations involving other polyester resins, sufficient exothermic heat is produced during the addition of hydrogen peroxide so that no external heat is required, or even some external cooling may be required. The product was then filtered, finally pressing the cation exchange resin filter cake. The acid value of the total resin solution was 56.9. The percent nonvolatile of this solution, amounting to 559 parts, was 50.

A dehydrated basic form of an anion exchange resin was then prepared. Anion exchange resins, such as Dowex I (Dow Chemical Company) are purchased commercially as the mineral acid salt such as the hydrochloride. The salt form was first neutralized with strong alkali, such as sodium hydroxide, and finally washed free of the excess alkali and inorganic salt. The wet resin was then dehydrated by placing it in a vacuum oven at a temperature of 80° C. for a period of approximately 16 hours.

The 559 parts of epoxide solution was thoroughly mixed with 175 parts of the dehydrated basic form of anion exchange resin. The resulting mixture was then filtered followed by pressing as much of the solution as possible from the anion exchange resin cake. This product had an acid value of 10.1 on the nonvolatile resin content. The epoxide equivalent (equivalent weight to epoxide group) was 304 on the nonvolatile resin content.

The epoxide values as discussed herein were determined by refluxing for 30 minutes a 2-gram sample of the epoxide composition with 50 milliliters of pyridine hydrochloride in excess pyridine. The pyridine hydrochloride solution was prepared by adding 20 milliliters of concentrated HCl to a liter of pyridine. After cooling to room temperature, the sample is then back-titrated with standard alcoholic sodium hydroxide.

EXAMPLE II

Using the same procedure as in Example I, a polyester resin was prepared from 3 mols of tetrahydrophthalic anhydride, 2 mols of ethylene glycol and 2 mols of n-butanol. The product had an iodine value of 100 and an acid value of 4.

252 parts of this polyester resin was epoxidized in accordance with the procedure of Example I to give a product having an acid value of 6 and an epoxide equivalent of 268, both values being based on the nonvolatile content.

EXAMPLE III

Using the procedure of Example I, a polyester resin was prepared from 1.1 mols of tetrahydophthalic anhydride, 1 mol of diethylene glycol, and 0.2 mol of n-butanol to give a product having an acid value of 3.9 and an iodine value of 101.

250 parts nonvolatile of the polyester resin was epoxidized in accordance with the procedure of Example I to give a product having an epoxide equivalent of 314 and an acid value of 13.2 on the nonvolatile content.

EXAMPLES IV–IX

Using the procedure of Example I, mixed polyepoxide polyesters were prepared using the reagents set forth in Examples IV to IX, Table 1, in the molar ratios indicated. Characterizing data with respect to both the polyepoxide polyesters and the intermediately formed polyesters is also presented in tabular form in Table 1.

*Table 1*

| Example | IV | V | VI | VII | VIII | IX |
|---|---|---|---|---|---|---|
| Reagents employed: | | | | | | |
| Tetrahydrophthalic acid, moles | 5 | 3 | 3 | 5 | 4 | 6 |
| Ethylene glycol, moles | | | 2 | | 2 | 6 |
| Diethylene glycol, moles | 5 | 2 | 2 | | 1 | 5 |
| 1,4-butanediol, moles | 4 | 6 | | 5 | | |
| Phthalic anhydride, moles | 5 | | | 1 | | |
| Succinic anhydride, moles | | 6 | | | | |
| Maleic anhydride, moles | | | 2 | | | |
| N-butyl alcohol, moles | 2 | 2 | 2 | 2 | 2 | 2 |
| Dimer acid,* moles | | | | | | 6 |
| Polyester data: | | | | | | |
| Percent Nonvolatile (N.V.) | 57.00 | 54.91 | 53.85 | 54.33 | 53.70 | 50.73 |
| Acid value | 11.7 | 13.7 | 11.6 | 13.7 | 7.80 | 9.40 |
| Iodine value | 40.2 | 37.8 | 69.5 | 88.3 | 114.0 | 70.7 |
| Olefin equivalent | 651 | 675 | 365 | 288 | 223 | 359 |
| Epoxidized polyester data: | | | | | | |
| Percent Nonvolatile (N.V.) | 57.10 | 53.25 | 51.10 | 52.52 | 53.76 | 38.35 |
| Acid value (on N.V.) | 15.30 | 17.70 | 18.50 | 16.9 | 14.0 | 14.4 |
| Percent Oxiran oxygen by weight | 2.38 | 2.13 | 3.78 | 5.01 | 6.07 | 2.52 |
| Epoxy equivalent | 672.2 | 751.9 | 423.8 | 319.3 | 263.7 | 635.5 |
| Percent epoxidation attained | 96.36 | 91.81 | 90.00 | 95.25 | 90.73 | 59.02 |

*A 36 carbon atom dicarboxylic acid obtained by heating the methyl esters of linoleic at high temperatures for 8–20 hours, commercially available from Emery Industries, Cincinnati, Ohio.

Examples X–XV, Table 2, disclose products of the invention prepared by reacting polyepoxide polyesters of Examples IV–IX with the monobasic unsaturated aliphatic acids indicated. Examples XII and XIII illustrate compositions which are modified with minor amounts of cyclic and aliphatic dicarboxylic acids. The quantities of the polyesters and aliphatic acids utilized are stated in grams. The approximate reaction time and temperature of the reactions are given. Also given are the solubilities of the new resinous drying compositions in a number of well known solvents, their acid values and melting points. The procedural technique employed in the production of these synthetic esters was similar to that of Examples XVI and XVII which follow Table 2.

The xylene solution was treated with .1% zirconium naphthenate drier based on nonvolatile content, spread in .002" wet films, and cured for 30 minutes at 175° C. Tack-free, flexible films were obtained which withstood boiling water for a period of 15 hours and 5% aqueous sodium hydroxide for a period of 45 minutes.

EXAMPLE XVII

Using the procedure of Example XVI, a mixture of 536 parts non-volatile of the product of Example II and 845 parts of soybean oil acids was esterified for a period of about 8 hours until the acid value had decreased to 10.2. The product was dissolved in xylene to a nonvolatile content of 50%.

*Table 2*

| Example | X | XI | XII | XIII | XIV | XV |
|---|---|---|---|---|---|---|
| Polyester: | | | | | | |
| IV | 62.2 g | | | | | |
| V | | 75.2 g | | 75.2 g | | |
| VI | | | 42.4 g | | | |
| VII | | | 31.9 g | | 31.9 g | |
| VIII | | 26.4 g | | | | 52.8 g. |
| IX | | | 63.5 g | | 63.5 g | |
| Acid: | | | | | | |
| Linseed acids | 13.5 g | | | 29.0 g | 29.0 g | |
| Rapeseed acids | | 75.8 g | | | | |
| Soya acids | | | 28.2 g | | 28.2 g | |
| Isoline acids | | | 29.2 g | | | 58.4 g. |
| Sorbic acids | 5.6 g | | | | | |
| Oleic acid | | | 28.2 g | | | |
| Phthalic (anhydride) | | | 1.5 | | | |
| Dimer acid* | | | | 5.6 g | | |
| Reaction Conditions and Characterizing Data: | | | | | | |
| Time | 3 hrs | 11 hrs | 3.5 hrs | 13 hrs | 6 hrs | 2.5 hrs. |
| Temperature | 220° C | 230° C | 230° C | 225° C | 240° C | 230° C. |
| Acid value | 6.2 | 8.4 | 8.0 | 5.1 | 9.6 | 8.2. |
| Melting point (Durran's) | 43° C | Glass | Glass | Glass | Glass | Glass. |
| Solubilities: | | | | | | |
| Heptane | Ins | S | P.S | Ins | V.S | V.S. |
| Xylene | Sl. S | Ins | V.S | V.S | V.S | V.S. |
| Methyl ethyl ketone | V.S | V.S | V.S | V.S | V.S | V.S. |
| Butyl alcohol | Ins | P. Sol. (V.S. hot). | P. Sol. (V.S. hot). | P. Sol. (S. hot). | P. Sol. (V.S. hot). | V.S. |
| CCl | Ins | V.S | V.S | V.S | V.S | V.S. |

*See footnote at bottom of Table 1.

KEY.—S. soluble. V.S. very soluble. P.S. partially soluble. Ins. insoluble. Sl. S. slightly soluble.

Examples XVI and XVII illustrate the preparation of flexible, tack-free films from mixtures of typical polyepoxide polyesters and monobasic unsaturated acids using reaction mixtures wherein the number of epoxide groups in the reaction mixture is less than the number of carboxyl groups in the mixture. Under these conditions, esterification of the carboxyl groups includes esterification by the hydroxyl groups formed by the splitting of the epoxide groups as well as esterification by the epoxide groups. The complex reaction products were prepared by pre-esterifying the carboxyl groups prior to polymerization through the unsaturated portions of the acids.

EXAMPLE XVI

In a vessel provided with a thermometer, a mechanical agitator and a reflux condenser attached through a water trap was placed a mixture of 606 parts nonvolatile of the product of Example I and 730 parts of dehydrated castor oil acids. While bubbling nitrogen through the reaction mixture, the temperature of the mixture was raised to 195–220° C. and the esterification was allowed to proceed removing water formed in the esterification by distillation through the water trap. The reaction was continued until the acid value of the mixture had decreased to 11.6, a period of about 11 hours. The product was dissolved in xylene to a nonvolatile content of 50%.

The xylene solution was treated with .02% cobalt naphthenate drier and .06% zirconium naphthenate drier based on nonvolatile content, spread in .002" wet films, and cured for 30 minutes at 175° C. Tack-free, flexible films were obtained which withstood boiling water for 15 hours without deterioration.

As Example XVIII (a)–(p) there is set forth in Table 3, additional mixtures and reaction products prepared from polyepoxide polyesters and monobasic unsaturated aliphatic acids using ratios such that the mixture contained substantially at least one or more epoxide groups for each carboxyl group in the mixture. These mixtures were spread in .002" wet films and then cured, using small amounts of metallic ion catalysts and allowing esterification and polymerization through the unsaturated portions to proceed simultaneously, without prior esterification of the aliphatic unsaturated acids. Cured films from these mixtures were flexible and tack-free, and showed remarkable chemical resistivity. The reactants, curing temperatures, curing periods, and driers used, together with resistivity to boiling water, are shown in the following table. In these preparations, an amount of polyepoxide resin equal to the equivalent weight of the polyepoxide was reacted with 1 mol of unsaturated aliphatic acid. The metallic cobalt and zirconium driers were naphthenate salts.

EXAMPLE XVIII

Table 3

| Polyepoxide Used | Unsaturated Acid Used | Tack-free Flexible Films | | |
|---|---|---|---|---|
| | | Percent Drier on Nonvolatile Content | Heat Treatment of .002" Wet Film | Withstood Boiling Water, hr. |
| Product of Example I: | | | | |
| (a) | Sorbic | 0.3% Zr, 0.1% Co. | 175° C., 30 min. | 21 |
| (b) | Oleic Acid | .01% Co, .04% Zr. | 175° C., 30 min. | 20 |
| (c) | Linseed oil acids. | .01% Co, .04% Zr. | 175° C., 30 min. | 26 |
| (d) | Rapeseed oil acids. | .01% Co, .02% Zr. | 175° C., 30 min. | 41 |
| (e) | Dehydrated castor oil acids. | .01% Co, .02% Zr. | 175° C., 30 min. | 20 |
| Product of Example II: | | | | |
| (f) | Sorbic | 0.1% Co, 0.4% Zr. | 185° C., 30 min. | 6 |
| (g) | Oleic | .01% Co, .03% Zr. | 175° C., 30 min. | 20 |
| (h) | Linseed oil acids. | .01% Co, .03% Zr. | 175° C., 30 min. | 20 |
| (i) | Rapeseed oil acids. | .01% Co, .02% Zr. | 175° C., 30 min. | 26 |
| (j) | Dehydrated castor oil acids. | .02% Co, .07% Zr. | 185° C., 30 min. | 51 |
| Product of Example III: | | | | |
| (k) | Sorbic | 0.1% Co, 0.4% Zr. | 185° C., 30 min. | 5 |
| (l) | Oleic | .01% Co, .04% Zr. | 185° C., 30 min. | 23 |
| (m) | Linseed oil acids. | .01% Co, .04% Zr. | 175° C., 30 min. | 20 |
| (n) | Rapeseed oil acids. | .01% Co, .02% Zr. | 175° C., 30 min. | 12 |
| (o) | Dehydrated castor oil acids. | .01% Co .02% Zr. | 175° C., 30 min. | 13 |
| (p) | Coconut oil acids. | .07% Co, .24% Zr. | 175° C., 30 min. | 18 |

EXAMPLE XIX 10 grams of the new synthetic product of Example XIV was dissolved in methyl ethyl ketone, to which was added approximately one tenth of one percent by weight of a boron trifluoride triethonal amine as catalyst. This composition was spread in a wet film of approximately .002" and cured at a temperature of 150° C. for 3 hours. A flexible tack-free film having resistance to hot water was formed. Comparable films can be prepared from the synthetic products of Examples XV and X–XIII.

From the foregoing it is apparent that these reaction mixtures of polyepoxide polyesters and unsaturated aliphatic acids have great utility in the manufacture of more complex reaction products such as may be used in protective coatings, varnishes, adhesives, etc.

The polyepoxides may be reacted with the unsaturated acids so that both the epoxide groups and the hydroxyl groups formed by splitting the epoxide groups, are esterified, or they may be reacted so that the esterification primarily involves only epoxide groups. Hard flexible films were obtained having good resistance to such materials as boiling water and alkali.

Other resinous materials commonly used in the preparation of varnishes, such as suitable modified oil-soluble resins and gums may be mixed with the reaction mixtures to give somewhat modified products. If desired, pigments, fillers, etc., may also be added depending upon the characteristics desired in the final reaction products.

While various modifications of this invention have been described, it is not intended that this invention be limited thereby and it is desired to cover all modifications of this invention which would be apparent to one skilled in the art and which come within the scope of the appended claims.

This application is a continuation-in-part of copending application Serial No. 519,272, filed June 30, 1955, now abandoned.

It is claimed and desired to secure by Letters Patent:

1. New compositions of matter useful for the production of more complex reaction products comprising (A) resinous polyepoxide polyesters of tetrahydrophthalic acid and glycols containing epoxy oxygen bridging adjacent carbon atoms of the tetrahydrophthalic acid residues, and (B) monomeric unsaturated aliphatic monocarboxylic acids having at least about 6 carbon atoms, said mixtures containing from about 1 to about 2 carboxyl groups of said monocarboxylic acids for each epoxide group of said polyepoxide polyester.

2. New compositions of matter useful for the production of more complex reaction products comprising resinous polyepoxide polyesters of tetrahydrophthalic acid and glycols containing epoxy oxygen bridging adjacent carbon atoms of the tetrahydrophthalic acid residues and monomeric unsaturated glyceride oil acids, said mixtures containing from about 1 to about 2 carboxyl groups of said glyceride oil acids for each epoxide group of said polyepoxide polyester.

3. New compositions of matter according to claim 2 wherein the unsaturated oil acids are linseed oil acids.

4. New compositions of matter according to claim 2 wherein the unsaturated oil acids are soyabean oil acids.

5. New compositions of matter according to claim 2 wherein the unsaturated oil acid is oleic acid.

6. New compositions of matter according to claim 2 wherein the unsaturated oil acids are dehydrated castor oil acids.

7. New compositions of matter useful for the production of more complex reaction products comprising resinous polyepoxide polyesters of tetrahydrophthalic acid and glycols containing epoxy oxygen bridging adjacent carbon atoms of the tetrahydrophthalic acid residues and sorbic acid, said mixture containing from about 1 to about 2 carboxyl groups of sorbic acid for each epoxide group of said polyepoxide polyester.

8. A new composition of matter useful for the production of more complex reaction products comprising resinous esters of: (A) an epoxidized polyester of tetrahydrophthalic acid and a glycol, said polyester having an average of more than one epoxy group wherein the epoxy oxygen atom is linked to adjacent carbon atoms in the nucleus of said acid and (B) a monomeric unsaturated aliphatic monocarboxylic acid having at least about 6 carbon atoms the proportions of (A) and (B) being adjusted to have from about 1 to about 2 carboxyl groups of said monocarboxylic acid for each epoxy group of said epoxidized polyester.

9. The composition of claim 8 wherein the unsaturated aliphatic monocarboxylic acid is an unsaturated glyceride oil acid.

10. The composition of claim 8 wherein the unsaturated aliphatic monocarboxylic acid is an unsaturated soyabean oil acid.

11. The composition of claim 8 wherein the unsaturated aliphatic monocarboxylic acid is rapeseed oil acid.

12. The composition of claim 8 wherein the unsaturated aliphatic monocarboxylic acid is linseed oil acid.

13. The composition of claim 8 wherein the unsaturated aliphatic monocarboxylic acid is oleic acid.

14. The composition of claim 8 wherein said unsaturated aliphatic monocarboxylic acid is a mixture of unsaturated aliphatic monocarboxylic acids having at least about 6 carbon atoms.

15. The composition of claim 8 wherein said glycol is a mixture of aliphatic glycols.

16. The composition of claim 8 wherein said epoxidized polyester of (A) is comprised of at least one organic dicarboxylic acid in addition to tetrahydrophthalic acid.

17. The infusible and insoluble reaction product of a mixture comprising (A) an epoxidized polyester of tetrahydrophthalic acid and a glycol, said polyester having an average of more than one epoxy group wherein the epoxy oxygen atom is linked to adjacent carbon atoms in the nucleus of said acid and (B) a monomeric unsaturated aliphatic monocarboxylic acid having at least about 6 carbon atoms; (A) and (B) being chemically united through the epoxide groups of (A) and the carboxyl groups of (B) and the reaction product of (A) and (B) being chemically united with like reaction products of (A) and (B) through the ethylenically unsaturated linkages of (B); the proportions of (A) and (B) being adjusted to have from about 1 to about 2 carboxyl groups of said monocarboxylic acid for each epoxy group of said epoxidized polyester.

18. The infusible and insoluble composition of claim 17 wherein there is an average of more than one unsaturated monocarboxylic acid residue of (B) attached to each of the epoxidized tetrahydrophthalic acid residues of (A).

References Cited in the file of this patent

UNITED STATES PATENTS

| | | |
|---|---|---|
| 2,581,464 | Zech | Jan. 8, 1952 |
| 2,691,004 | Doyle | Oct. 5, 1954 |
| 2,720,500 | Cody | Oct. 11, 1955 |
| 2,806,057 | Finch et al. | Sept. 10, 1957 |
| 2,852,477 | Greenlee | Sept. 16, 1958 |
| 2,976,265 | Pearce | Mar. 21, 1961 |
| 3,023,178 | Greenlee et al. | Feb. 27, 1962 |

UNITED STATES PATENT OFFICE
CERTIFICATE OF CORRECTION

Patent No. 3,113,932                          December 10, 1963

Sylvan Owen Greenlee et al.

It is hereby certified that error appears in the above numbered patent requiring correction and that the said Letters Patent should read as corrected below.

Columns 7 and 8, Table 2, column 2, line 1 thereof, for "62.2" read -- 67.2 --; same Table 2, column 1, line 28 thereof, for "CCl" read -- $CCl_4$ --; column 9, line 52, before "synthetic products" insert -- new --.

Signed and sealed this 26th day of May 1964.

(SEAL)
Attest:

ERNEST W. SWIDER                              EDWARD J. BRENNER
Attesting Officer                                    Commissioner of Patents